July 17, 1956 — L. ROGOFF — 2,755,454
BATTERY CABLE TERMINAL
Filed Aug. 24, 1953
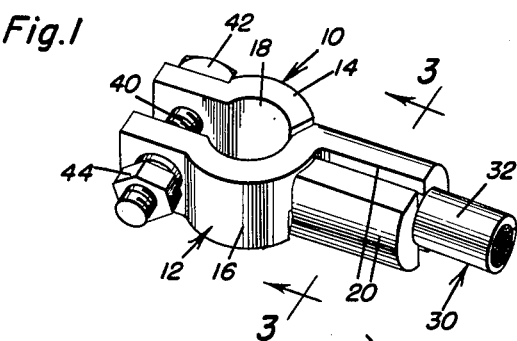
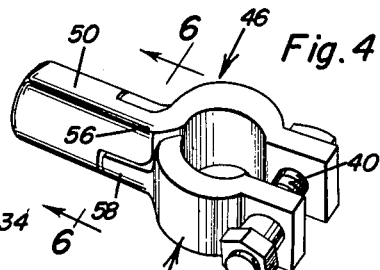
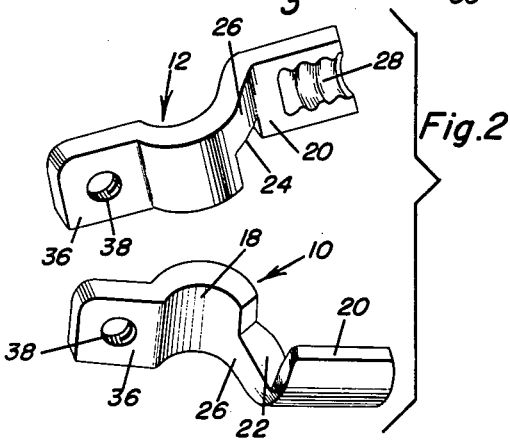
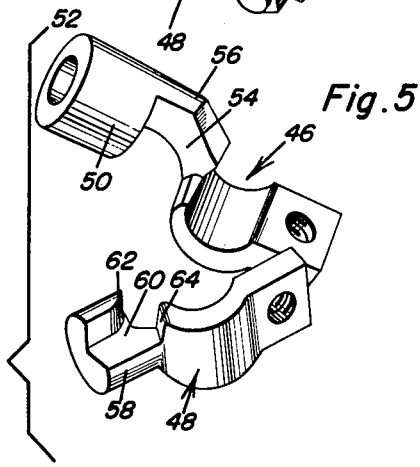
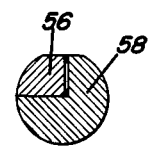
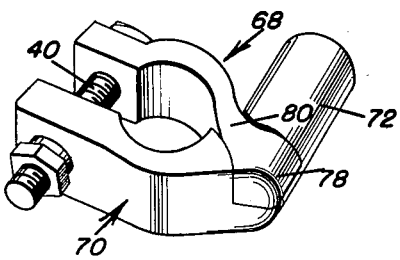
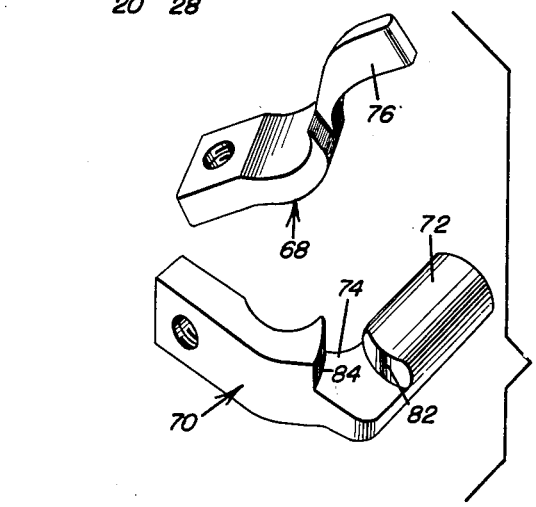
Louis Rogoff
INVENTOR.
BY *[signatures]*
Attorneys

United States Patent Office 2,755,454
Patented July 17, 1956

2,755,454

BATTERY CABLE TERMINAL

Louis Rogoff, New Haven, Conn.

Application August 24, 1953, Serial No. 375,922

2 Claims. (Cl. 339—231)

This invention relates generally to automotive accessories and pertains more particularly to an improved form of battery cable terminal.

A primary object of this invention is to provide an improved form of battery cable terminal which is formed of interfitting or interlocking members so as to attain an improved clamping action on an associated battery post and also enabling the device to be quickly attached and detached on the battery post.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of one form of the invention showing a portion of an associated battery cable and showing the part in interlocked position;

Figure 2 is an exploded perspective view of the assembly shown in Figure 1;

Figure 3 is a transverse vertical section taken substantially along the plane of section line 3—3 in Figure 1;

Figure 4 is a perspective view of a modified form of the invention;

Figure 5 is an exploded perspective view of the assembly shown in Figure 4;

Figure 6 is a transverse vertical section taken substantially along the plane of section line 6—6 of Figure 4;

Figure 7 is a perspective view of a still further modified form of the invention; and Figure 8 is an exploded perspective view of the assembly shown in Figure 7.

Referring now more particularly to Figures 1–3, the reference characters 10 and 12 designate generally a pair of clamping members which incorporate arcuated intermediate portions 14 and 16 respectively, each provided on its inner surface with a vertical groove 18, which grooves are adapted to seat on opposite sides of an associated battery post to establish electrical connections therewith. Each member also incorporates a shank 20 and the members are each notched as at 22 and 24 at the juncture of the intermediate portion and the shanks so that they may be interfitted and interlocked in the manner shown most clearly in Figure 1 wherein each of the neck portions 26 extend through the notch in the other member. The shanks 20 are provided on their inner surfaces with longitudinally extending corrugated grooves 28 which are adapted to frictionally engage the free end of a battery cable indicated generally by the reference character 30, which includes an outer insulating substance 32 terminating at the rear end of the shanks and an inner metallic core 34 as is conventional.

The opposite ends of the clamping members are provided with the longitudinally extending ear members 36 each of which is apertured as at 38 for receiving the clamping bolt 40 having an enlarged head 42 at one end and provided with a removable nut 44 at its other end.

In operation of the assembly above described, it will be manifest that the bared end of the battery cable 30 is inserted between the shank portion 20 and the intermediate portions are engaged upon opposite sides of the battery post whereupon the clamping bolt assembly is tightened forcing the shanks 20 and the intermediate portions 14 and 16 into engagement with the battery cable and battery post respectively. In this respect, it will be noted that the effective transverse width of the notches 22 and 24 is greater than the thickness of the neck portions 26 such that the sliding motion is permitted between the two clamping members to assure proper frictional grip against both the battery cable and the battery post.

Referring now more particularly to Figures 4–6 wherein a modified form of the assembly is shown, reference character 46 indicates generally one of a pair of clamping members and the reference character 48 designates generally the other of the pair. The intermediate and ear portions of the members 46 and 48 are of design similar to that previously described but the shank 50 of the clamping member 46 is provided with a longitudinal bore 52 for receiving an associated battery cable, which may be suitably secured thereto as by soldering or the like. The member 46 is notched as at 54 and its neck portion 56 is of generally quadrantal configuration in cross section as shown most clearly in Figure 6 whereas the shank 58 of the member 48 is notched or cut away as at 60 to receive the quadrantal neck 56 in the manner shown. The distance between the shoulders 62 and 64 on the member 48 is slightly greater than the thickness of the neck portion 56 associated therewith so that when the clamping bolt assembly 40 is tightened, the intermediate or jaw portions of the members 46 and 48 will firmly engage an associated battery post without imparting undue stress or bending on the shank portions of these members.

Referring now more particularly to Figures 7 and 8 wherein a still further modified form of the invention is shown, the reference characters 68 and 70 indicate generally the two clamping members, one of which is provided with a right-angularly extending shank portion 70 recessed to receive an associated battery cable and which is provided with a transverse notch 74 receiving the shank portion 76 of the other member 68. The latter shank 76 terminates in an enlarged head 78 received within the largest portion of the notch 74 and the neck portion 80 of this member is disposed between the inner corners of the notch 74 in the manner shown, it being noted that the notch 74 is, at this point, wider than the neck 80. The enlarged head 78 not only prevents lateral disengagement between the members 68 and 70, but also provides a pivot point when the clamping bolt 40 is tightened, the opposed faces 82 and 84 of the notch 74 being arcuated to permit this pivotal movement.

Of course, it will be readily understood that the assembly shown in Figures 7–8 may be provided in both a left hand and a right hand form, as desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A battery terminal clamp comprising a pair of coacting arcuate members, said arcuate members having clamping means on one end, the other end of said arcuate members having recessed complementary parts, said clamping means including spaced apertured ears and a threaded member passing through said ears and normally urging said ears towards each other, said complementary parts including a lower part and an upper part, said lower part being recessed to present an upwardly facing seat, said upper part being freely seated on said seat whereby said upper part will lift upwardly away from said seat and said lower part by pivoting thereof about the axis of said threaded member, said upper and lower parts being normally loosely interlocked and forming a fulcrum for said arcuate members upon actuation of said threaded member, and means on at least one of said arcuate members for attachment to a battery cable.

2. The battery terminal clamp of claim 1 wherein said threaded fastener is interlocked with said arcuate member having said upper part whereby when said threaded member is rotated to release said arcuate members, said upper part will automatically rotate out of engagement with said lower part.

References Cited in the file of this patent

UNITED STATES PATENTS

| | | |
|---|---|---|
| 1,808,698 | Wallis | June 2, 1931 |
| 1,816,719 | Buschman | July 28, 1931 |
| 1,968,137 | Gay | July 31, 1934 |
| 2,078,846 | Goulding | Apr. 27, 1937 |